(12) United States Patent
Mastio et al.

(10) Patent No.: US 9,020,442 B1
(45) Date of Patent: Apr. 28, 2015

(54) RANGING METHOD, RANGING DEVICE, LOCATION DEVICE AND LOCATION METHOD

(71) Applicant: Dizic Co., Ltd., Taipei (TW)

(72) Inventors: Daniel Mastio, Taipei (TW); Zbigniew Ianelli, Wroclaw (PL)

(73) Assignee: Dizic Co., Ltd., Taipei (TW)

( * ) Notice: Subject to any disclaimer, the term of this patent is extended or adjusted under 35 U.S.C. 154(b) by 82 days.

(21) Appl. No.: 14/051,204

(22) Filed: Oct. 10, 2013

(51) Int. Cl.
*H04B 17/00* (2006.01)
*H04W 24/08* (2009.01)
*G01S 11/02* (2010.01)

(52) U.S. Cl.
CPC ............... *H04W 24/08* (2013.01); *G01S 11/02* (2013.01)

(58) Field of Classification Search
CPC .......... H04B 17/0042; H04B 17/0085; H04W 24/00; H04L 1/0026
USPC ............................................ 455/67.11, 67.14
See application file for complete search history.

(56) References Cited

U.S. PATENT DOCUMENTS

| | | | | |
|---|---|---|---|---|
| 8,179,251 | B2 * | 5/2012 | Alsindi et al. ............. | 340/539.1 |
| 8,830,088 | B2 * | 9/2014 | Hod et al. .................. | 340/932.2 |
| 8,842,495 | B2 * | 9/2014 | Hersey .......................... | 367/124 |
| 2007/0285306 | A1 * | 12/2007 | Julian et al. .................... | 342/118 |
| 2010/0045508 | A1 * | 2/2010 | Ekbal et al. .................... | 342/145 |
| 2010/0134321 | A1 * | 6/2010 | Kim .......................... | 340/932.2 |
| 2010/0182433 | A1 * | 7/2010 | Shimbo et al. ................ | 348/153 |
| 2011/0250844 | A1 * | 10/2011 | Gorday et al. ............... | 455/41.2 |
| 2011/0292819 | A1 * | 12/2011 | Ekbal et al. .................... | 370/252 |
| 2011/0292820 | A1 * | 12/2011 | Ekbal et al. .................... | 370/252 |
| 2011/0316747 | A1 * | 12/2011 | Budianu et al. ............... | 342/387 |
| 2012/0086347 | A1 * | 4/2012 | Lee et al. .................. | 315/185 R |
| 2014/0179340 | A1 * | 6/2014 | Do et al. .................... | 455/456.1 |
| 2014/0292580 | A1 * | 10/2014 | Raghupathy et al. ......... | 342/386 |

* cited by examiner

*Primary Examiner* — April G Gonzales
(74) *Attorney, Agent, or Firm* — Li & Cai Intellectual Property (USA) Office

(57) ABSTRACT

A ranging method, executed in a ranging device, comprising steps of: obtaining a trip time of a received wireless signal, wherein the received wireless signal is a wireless signal from an object; calculating a statistical value of a rising time of the received wireless signal; when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time.

16 Claims, 11 Drawing Sheets

RANGING METHOD, RANGING DEVICE, LOCATION DEVICE AND LOCATION METHOD

BACKGROUND

1. Technical Field

The present disclosure relates to a ranging method, in particular, to a ranging method and device considering the statistical value (for example, the standard deviation, i.e. time spread, while considering the noise is the additive white Gaussian noise (AWGN)) of the rising time of the received wireless ranging signal due to the noise, and to a location method and device using the ranging method or device.

2. Description of Related Art

The ranging method or device is used to estimate a distance between an object and a ranging device by using a wireless ranging signal. One currently marketed ranging device can detect the signal strength decay of the received wireless ranging signal to estimate the distance between the object and the ranging device, since the wireless ranging signal is attenuated along with the distance ideally. However, the signal strength decay is actually further in response to the channel response, such that this ranging device must obtain the channel response. Since a channel estimator may be required to obtain the channel response, the ranging device for detecting the signal strength decay of the received wireless ranging signal has large cost. Furthermore, if the channel is fast changed (i.e. not a static channel), the estimated distance between the object and the ranging device may have large difference to the actual distance between the object and the ranging device.

Furthermore, strength of received signal can be reasonable reduced by which the objects absorb the electromagnetic wave (EMW) propagated from the transmitter to the receiver. If such object (or objects) are obstructing first Fresnel zone, then level of received signal (radio signal strength, RSSI) is reasonably reduced. Objects which can heavily absorb EMW are thick concrete walls (especially when concrete wall is wet), layers of coal (in coal mines), water, and the similar ones.

As consequence, the distance estimation based on free space propagation model is loaded by big error, wherein the value of the error increases with additional attenuation, reflection, diffraction, diffusion and similar physical effects caused by surrounding objects (these effects are depending on their nature, dimensions, electrical properties, and so on).

Another currently marketed ranging device can calculate or count the trip time of the received wireless ranging signal to estimate the distance between the object and the ranging device, wherein the trip time comprises the rising time of the received wireless ranging signal since the trip time is the time difference between the rising time of the received wireless ranging signal and the rising time of the emitted wireless ranging signal, i.e. the trip time is also called delay time. However, since the channel inevitably has the noise, the rising time of the received wireless ranging signal is spread, i.e. the rising time of the received wireless ranging signal is lengthened. Thus, the estimated distance between the object and the ranging device may be shorter than the actual distance between the object and the ranging device.

Moreover, the location device may use the ranging device, wherein the ranging device is used to estimate the distances between the objects and the ranging device, and the location device can determined the location of the location device according to the estimated distances. Or alternatively, the distances between the object and the ranging devices are estimated by the ranging devices, and the location device can determine the location of the object according to the estimated distances. However, the higher the ranging accuracy of the ranging device is, the higher the location accuracy of the location device is. Thus, a ranging device with a precise accuracy is needed.

SUMMARY

An exemplary embodiment of the present disclosure provides a ranging method executed in a ranging device. The ranging method comprises steps of: obtaining a trip time of a received wireless signal, wherein the received wireless signal is a wireless signal from an object; calculating a statistical value of a rising time of the received wireless signal; evaluating whether the statistical value of the rising time of the received wireless signal is smaller than a specific value; when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time; and when the statistical value of the rising time of the received wireless signal is not smaller than the specific value, adjusting at least one parameter related to the statistical value of the rising time.

Another exemplary embodiment of the present disclosure further provides a ranging device comprising a physic module, a medium access control module, a controller, and a ranging module, wherein the medium access control module is connected to the physic module, the a controller is connected to the medium access control module, and a ranging module, connected between the medium access control module, and the controller is connected between the medium access control module and the controller. The physic module receives a wireless signal. The ranging module executes the steps of the above ranging method.

Furthermore, an exemplary embodiment of the present disclosure further provides location method and device using the above ranging device or method, wherein the ranging device or method may estimate several distances between several objects and the location device, and the location of the location device is thus determined by the estimated distances.

Moreover, in one exemplary embodiment of the present disclosure, while considering a noise is an additive white Gaussian noise, the statistical value of the rising time is a standard deviation of the rising time.

To sum up, the ranging and location methods or devices provided in the present disclosure has the larger accuracies than those of the conventional ranging and location methods or devices.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
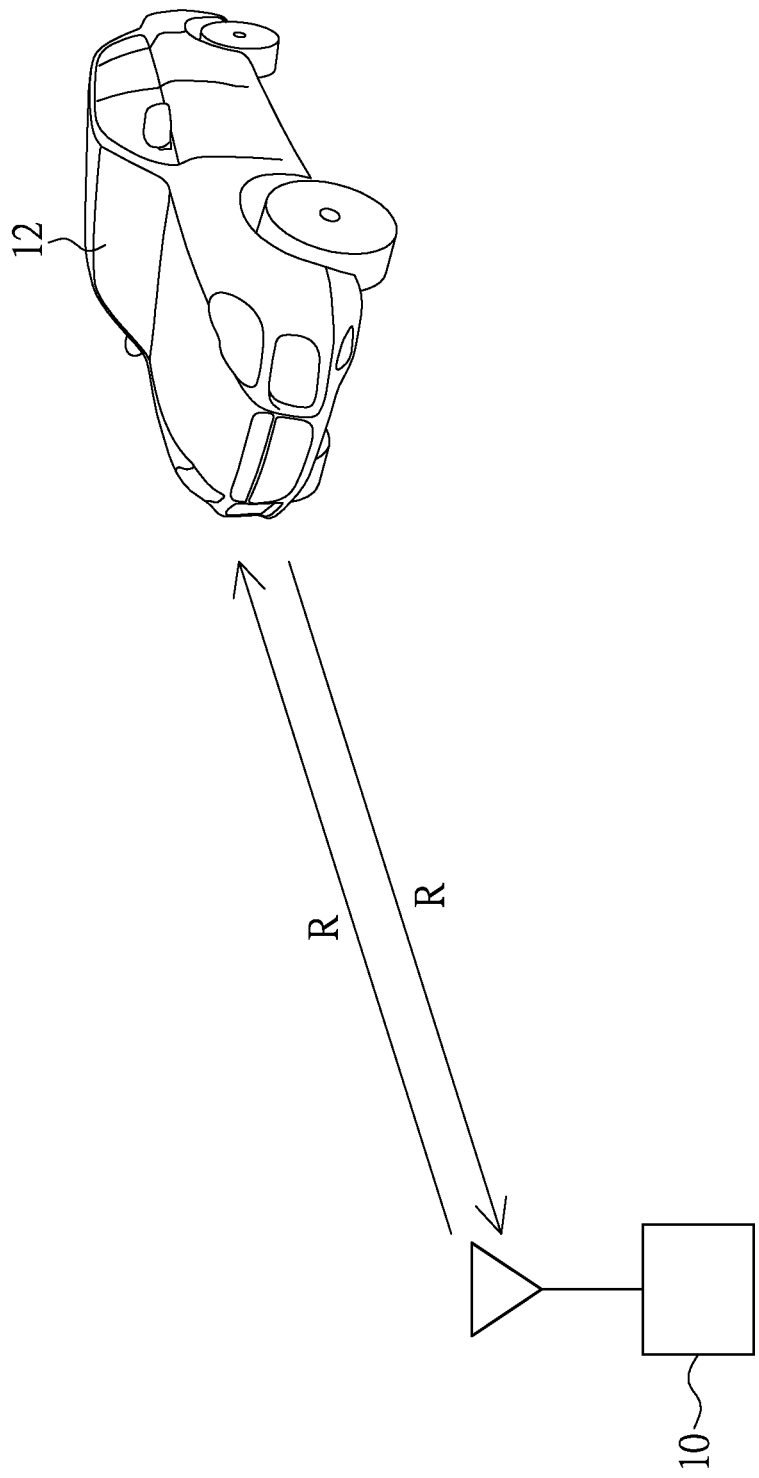
FIG. 1A is a schematic diagram showing a ranging theory according to one exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or similar parts.

The details of the ranging method, the ranging device, the location method, and the location device are described as follows, but it is noted that the following exemplary embodiments are not used to limit the present disclosure.

[Exemplary Embodiment of Ranging Device]

Referring to FIG. 1A, FIG. 1A is a schematic diagram showing a ranging theory according to one exemplary embodiment of the present disclosure. The ranging device is provided and equipped in the base station 10, and the ranging device comprises circuits for estimating a distance between an object 12 (such as the car) and the ranging device (or base station 10).

In the exemplary embodiment, the ranging device emits a wireless ranging signal to the object 12, and the object 12 responds to the wireless ranging signal emitted from the ranging device by sending back a wireless acknowledge signal; or alternatively the object 12 reflects the wireless ranging signal, and thus a wireless reflection signal from the object 12 propagates to the ranging device. Herein, to illustrate briefly and concisely, in the following descriptions, the wireless acknowledge signal is used as an example to state the principle of the ranging method of the exemplary embodiment in the present disclosure, but the present disclosure however is not limited thereto. It is obvious that the wireless acknowledge signal in the following description relative to the exemplary embodiment of FIG. 1A and FIG. 1B can be replaced by the wireless reflection signal.

The ranging device receives the wireless acknowledge signal from the object 12 (relied by the object 12). It is obvious that the wireless ranging signal and the wireless acknowledge signal travel a distance of 2R, and the distance between the object 12 and the ranging device (i.e. base station 10) is R.

Figure 1B:
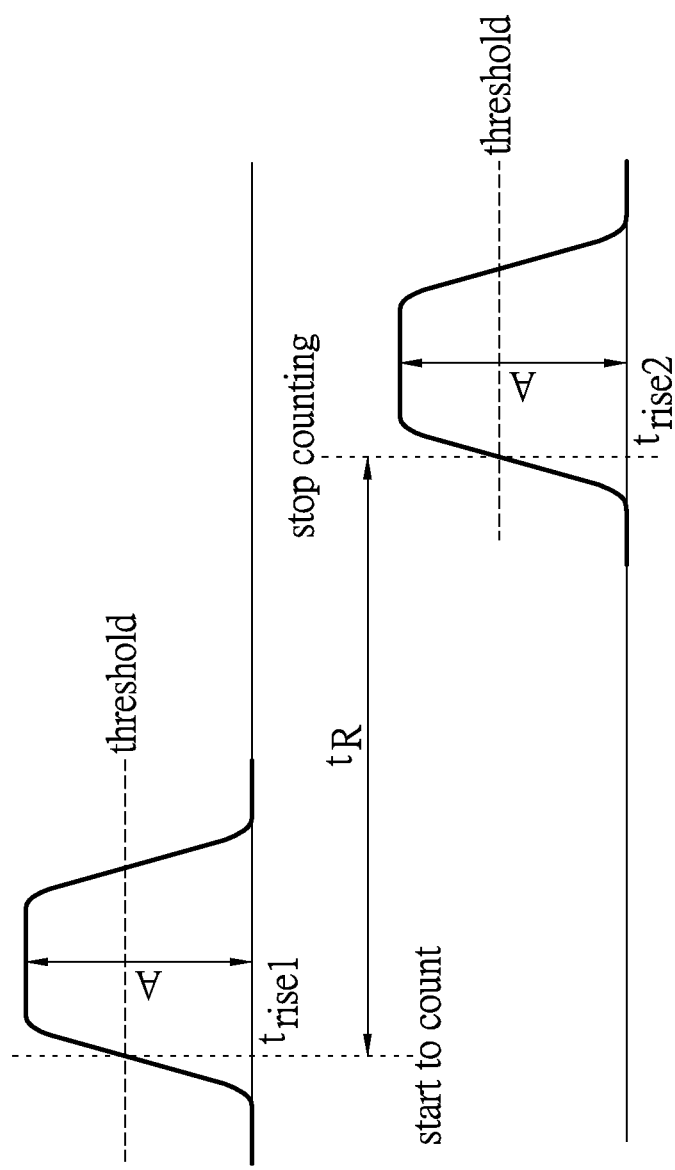
FIG. 1B is a wave diagram showing a wireless ranging signal emitted from a ranging device and an ideal wireless acknowledge signal responded (sent back) from an object according to one exemplary embodiment of the present disclosure.

Referring to FIG. 1A and FIG. 1B, FIG. 1B is a wave diagram showing a wireless ranging signal emitted from a ranging device and an ideal wireless acknowledge signal responded (or sent back) from an object according to one exemplary embodiment of the present disclosure. The ideal wireless acknowledge signal responded (or sent back) from the object 12 is received by the ranging device, and the trip time (or called delay time) of the ideal received wireless acknowledge signal is $t_R$ (after deduction of internal processing times). To put it concretely, the trip time $t_R$ of the ideal received wireless acknowledge signal is the time difference between the rising time $t_{rise2}$ of the ideal received wireless acknowledge signal (the signal in the bottom side of FIG. 1B) and the rising time $t_{rise1}$ of the emitted wireless ranging signal (the signal in the upper side of FIG. 1B). Counting the trip time $t_R$ (start and stop events) happens when the signal level crosses certain level determined by the threshold. The level of the threshold is selected between minimum (0%) and maximum (100%) of the ideal amplitude—usually about 50% ideal amplitude. The ranging device can estimate the trip time $t_R$ of the ideal received wireless acknowledge signal, and based on the estimated trip time $t_R$ of the ideal received wireless acknowledge signal, the distance between the object 12 and the ranging device 10 is thus estimated, i.e. $R=ct_R/2$.

Figure 2A:
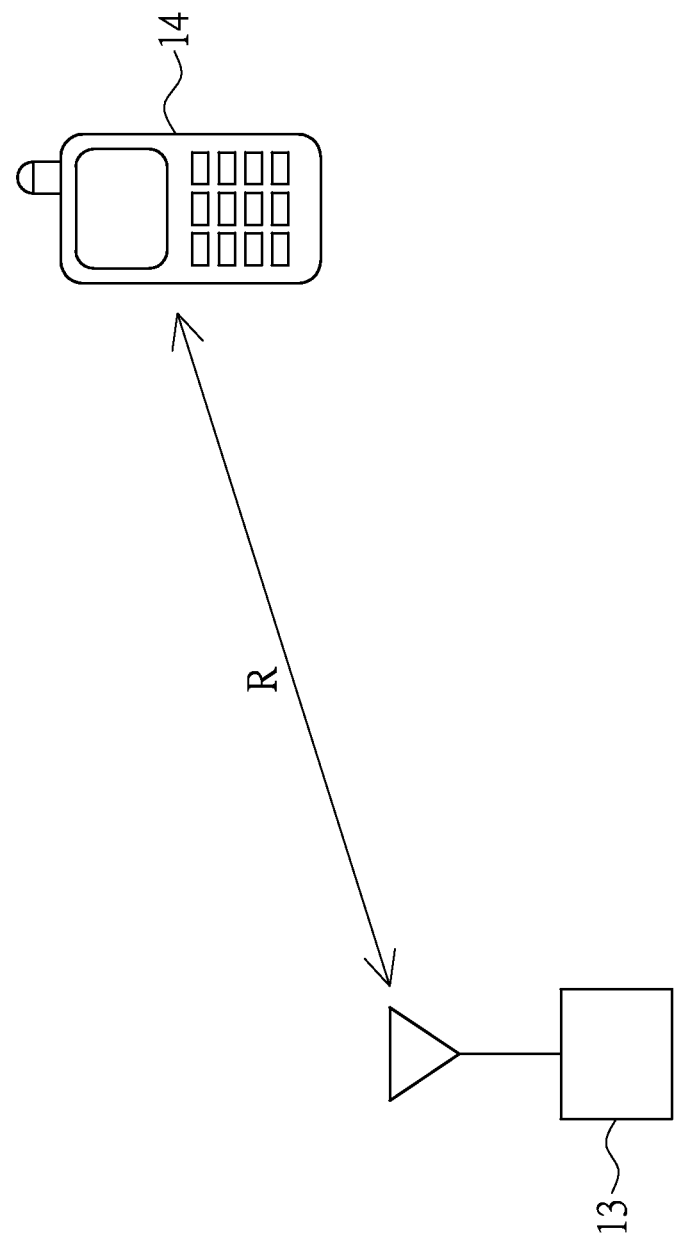
FIG. 2A is a schematic diagram showing a ranging theory according to another exemplary embodiment of the present disclosure.

Referring to FIG. 2A, FIG. 2A is a schematic diagram showing a ranging theory according to another exemplary embodiment of the present disclosure. In the exemplary embodiment, the ranging device is provided and equipped in the cell phone 14, and the ranging device comprises circuits for estimating a distance R between an object 13 (such as base station) and the ranging device.

In the exemplary embodiment, the object 13 emits a wireless ranging signal to the ranging device, and the ranging device receives the wireless ranging signal. It is obvious that the wireless ranging signal travels a distance of R, and the distance between the object 13 and the ranging device (i.e. cell phone 14) is R.

Figure 2B:
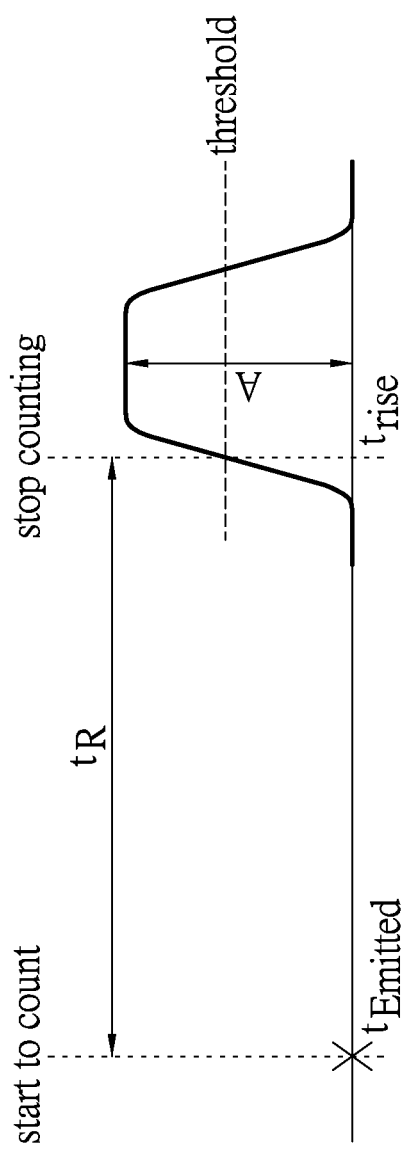
FIG. 2B is a wave diagram showing an ideal received wireless ranging signal according to one exemplary embodiment of the present disclosure.

Referring to FIG. 2A and FIG. 2B, FIG. 2B is a wave diagram showing an ideal received wireless ranging signal according to one exemplary embodiment of the present disclosure. The wireless ranging signal is received by the ranging device, and the ranging device can obtain the rising time $t_{Emitted}$ of the emitted wireless ranging signal. The trip time (or called delay time) of the ideal received wireless ranging signal is $t_R$. To put it concretely, the trip time $t_R$ of the ideal received wireless ranging signal is the time difference between the rising time $t_{rise}$ of the ideal received wireless ranging signal and the rising time $t_{Emitted}$ of the emitted wireless ranging signal. The ranging device can estimate the trip time $t_R$ of the ideal received wireless ranging signal, and based on the estimated trip time $t_R$ of the received wireless ranging signal, the distance between the object 13 and the ranging device is thus estimated, i.e. $R=ct_R$.

It is noted that the above scenario of the application of the ranging device is not used to limit the present disclosure. The ranging device or method provided by the present disclosure can be applied to all types of time based measurement (estimation) techniques, like round trip of flight (RToF) of one way, two ways, or symmetrical-double sided, time difference of arrival (TDoA), and so on. The ranging device or method provided by the present disclosure can be further applied to angle based techniques, such as angle of arrival (AoA), angle of departure (AoD) and so on.

Figure 3:
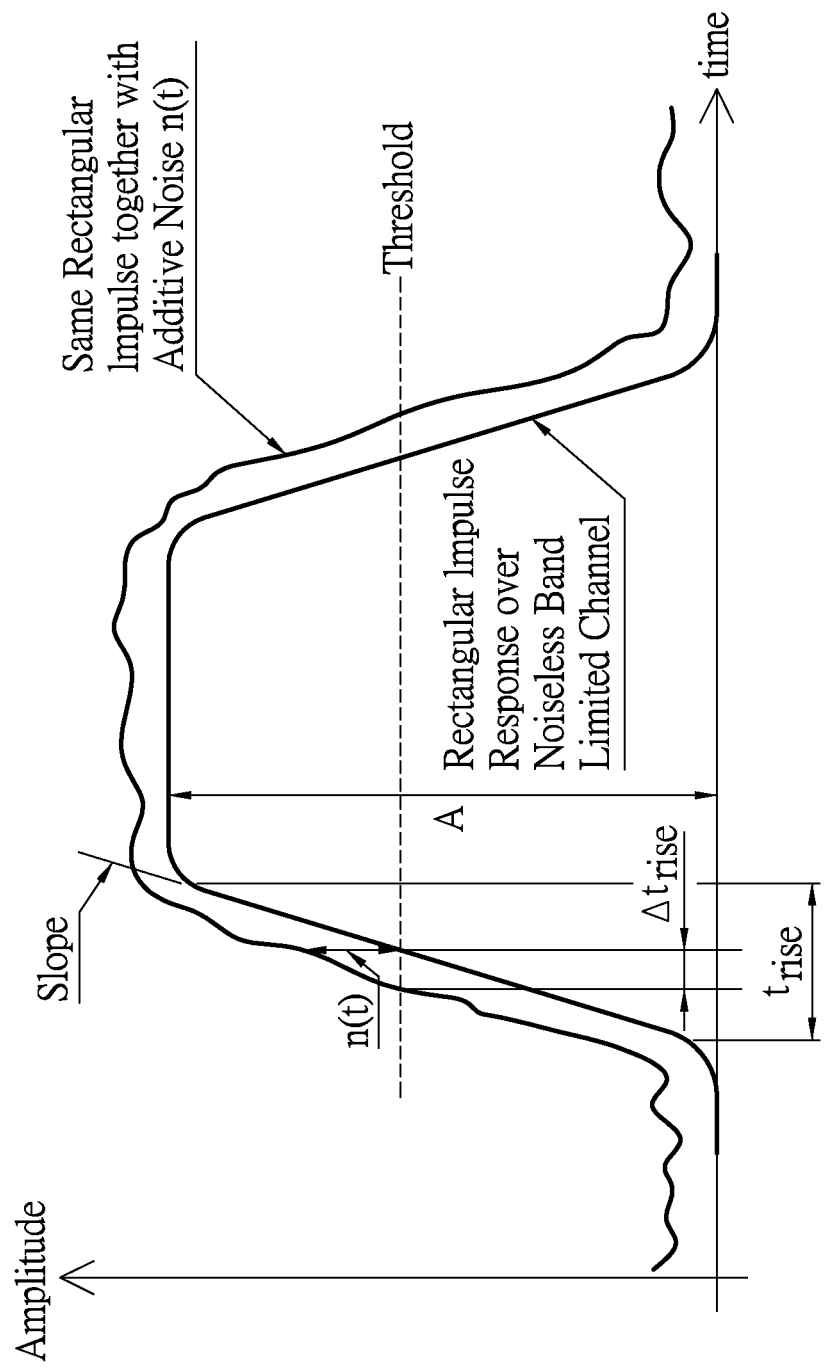
FIG. 3 is a wave diagram showing the received wireless signal in real world according to one exemplary embodiment of the present disclosure.

Referring to FIG. 3, FIG. 3 is a wave diagram showing the received wireless signal in real world according to one exemplary embodiment of the present disclosure. The channel inevitably has noise n(t), thus the rising edge of the received wireless signal (such as the received wireless ranging, acknowledge, or reflection signal) crosses threshold level earlier by time $\Delta t_{rise}$ such that the accuracy of the estimated distance is affected. Given a specific threshold, such as 50% ideal amplitude A of the received wireless signal, the rising time $t_{rise}$ of the received wireless ranging signal is the time that the amplitude of the received wireless signal exceeds 0.5 A.

It is noted that the specific threshold can be determined according to the different requirement. In one exemplary embodiment, the specific threshold be can related to the average maximum amplitude avg(A+n(t)) of the received wireless signal and the average minimum amplitude avg(n(t)) of the received wireless signal, and the equation of the specific threshold can be expressed as, threshold=(avg(A+n(t))k$_1$+ avg(n(t))k$_2$), wherein the variables k$_1$ and k$_2$ are respectively the weighting factors, for example the weighting factors k$_1$ and k$_2$ are 0.4, but the present disclosure is not limited.

Furthermore, the specific threshold can be an optimum threshold, and the optimum threshold can be determined by the differentiation of the received wireless signal in time domain. The differentiation of the received wireless signal has the maximum at a specific time, and the amplitude of the received wireless signal at the specific time can be set as the optimum threshold.

Due to the noise n(t), the rising edge of received wireless signal crosses threshold level earlier by time $t_{rise}$, so the measured error equals to $\Delta t_{rise}$ (i.e. standard deviation in the statistics while considering the noise n(t) is the AWGN) of the rising time $t_{rise}$. As shown in FIG. 3, the rising time $t_{rise}$ of the ideal received wireless signal and the rising time $t_{rise}$ of the actual received wireless signal with the noise n(t) have the measured error $\Delta t_{rise}$ of the rising time $t_{rise}$.

A slope of the received wireless signal can be obtained by the following expression, slope=A/$t_{rise}$. The slope of the received wireless signal is then expressed related to noise and the measured error $\Delta t_{rise}$ of the rising time of $t_{rise}$, and the expression is slope=n(t)/$\Delta t_{rise}$. Then, the measured error $\Delta t_{rise}$ of the rising time $t_{rise}$ can be expressed as follows, $$\Delta t_{rise} = \text{slope}/n(t) = \frac{n(t)}{\left(\frac{A}{t_{rise}}\right)} = \frac{t_{rise}}{\sqrt{\frac{A^2}{n(t)^2}}},$$

wherein $A^2/n(t)^2$ is the baseband signal-to-noise power ratio of the received wireless signal.

Considering a linear detector law and a large signal-to-noise ratio, the baseband signal-to-noise power ratio is twice the intermediate frequency (IF) signal-to-noise power ratio S/N, and the measured error $\Delta t_{rise}$ of the rising time $t_{rise}$ can be expressed as follows, $$\Delta t_{rise} = \frac{t_{rise}}{\sqrt{\frac{2S}{N}}}.$$

Then, if the rising time $t_{rise}$ of the received wireless signal is limited by the bandwidth B of the IF amplifier, the rising time $t_{rise}$ is about 1/B. Letting S=E$_S$/t$_d$ and N=N$_0$B, the measured error $\Delta t_{rise}$ of the rising time $t_{rise}$ can be expressed as follows, $$\Delta t_{rise} = \frac{t_{rise}}{\sqrt{\frac{2S}{N}}} = \sqrt{\frac{t_d N_0}{2 B E_S}},$$

wherein E$_S$ is signal energy of the received wireless signal, t$_d$ is the duration of the received wireless signal, and N$_0$ is the power spectral density (PSD) of the noise n(t).

If the same independent time delay measurement is done on the falling edged of the received wireless signal, then the measurement results from two combined and averaged individual measurements is improved by a square root of 2, and the measured error $\Delta t_{rise}$ of the rising time $t_{rise}$ can be expressed as follows, $$\Delta t_{rise} = \frac{1}{\sqrt{2}} \frac{t_{rise}}{\sqrt{\frac{2S}{N}}} = \frac{1}{2}\sqrt{\frac{t_d N_0}{2 B E_S}}.$$

It is noted that the measured error $\Delta t_{rise}$ of the rising time $t_{rise}$ is the root mean square (i.e. standard deviation) of the difference between the measured value and the true value. The disturbance limiting the accuracy of the distance measurement is assumed to be the receiver noise. It is furthermore assumed that bias errors have been removed. Radar theory states the relationship between standard deviation of the rising time $t_{rise}$, an effective bandwidth B$_{eff}$, and the signal-to-noise ratio E$_S$/N$_0$ as follows:

$$\Delta t_{rise} = \text{std\_dev}(t_{rise}) = \frac{1}{B_{eff}\sqrt{2\left(\frac{E_S}{N_0}\right)}}.$$

Furthermore, the effective bandwidth B$_{eff}$ is expressed as:

$$B_{eff}^2 = \frac{1}{E_S}\int_{-\infty}^{\infty}(2\pi f)^2(|S(f)|)^2\, df,$$

wherein the variable f is the frequency, and the function S(f) is the spectrum of received wireless signal. It is noted that the effective bandwidth B$_{eff}$ is the same as the root mean square bandwidth B$_{rms}$.

If the received wireless signal has a frequency band limited signal (with a frequency bandwidth $\Delta f$) spectrum at the base band, like the chirp with the constant spectrum magnitude (i.e. |S(f)|=1 in-band, and |S(f)|=0 otherwise), the effective bandwidth B$_{eff}$ can be expressed as, $$B_{eff}^2 = \frac{1}{E_S} \int_{-0.5\Delta f}^{0.5\Delta f} (2\pi f)^2 (|S(f)|)^2 \, df = \frac{4\pi^2}{E_S} \int_{-0.5\Delta f}^{0.5\Delta f} f^2 \, df = \frac{\pi^2}{3E_S} \Delta f^3.$$

That is, the effective bandwidth $B_{eff}$ can be expressed as, $$B_{eff} = \sqrt{\frac{\pi^2}{3E_S} \Delta f^3}.$$

Furthermore, if the received wireless signal has the continuous sharp rectangular waveform with period $t_d$, the root mean square bandwidth $B_{rms}$ (i.e. $B_{eff}$) can be expressed as follows, $$B_{rms}^2 = \frac{\int_{-\infty}^{\infty} (2\pi f)^2 (|S(f)|)^2 \, df}{\int_{-\infty}^{\infty} (|S(f)|)^2 \, df} = \frac{\int_{-\infty}^{\infty} (2\pi f)^2 \frac{\sin(\pi f t_d)^2}{(\pi f)^2} \, df}{\int_{-\infty}^{\infty} \frac{\sin(\pi f t_d)^2}{(\pi f)^2} \, df} =$$

$$= \frac{1}{E_S} \int_{-\infty}^{\infty} (2\pi f)^2 (|S(f)|)^2 \, df = \frac{4}{E_S} \int_{-\infty}^{\infty} \sin(\pi f t_d)^2 \, df.$$

Since the spectrum bandwidth is limited to B, the above equation of the root mean square bandwidth can expressed as follows, $$B_{rms}^2 = \frac{4}{E_S} \int_{-0.5B}^{0.5B} \sin(\pi f t_d)^2 \, df.$$

After several calculation have been done, the root mean square bandwidth $B_{rms}$ (i.e. $B_{eff}$) can be expressed as follows, $$B_{rms} = \sqrt{\frac{1}{t_d^2} \frac{\pi B t_d - \sin(\pi B t_d)}{\text{Sinc}(\pi B t_d) + \frac{\cos(\pi B t_d) - 1}{\pi B t_d}}}.$$

It is noted that the standard deviation is optimal for the AWGN statistic. For other types of noises and interferences (especially Human-made interferences, having regular time-frequency pattern), another statistical measure can be optimal—not always standard deviation. The following exemplary embodiments are illustrated while taking the statistical value of the rising time is the standard deviation of the rising time, but the present disclosure is however not limited thereto.

Figure 4:
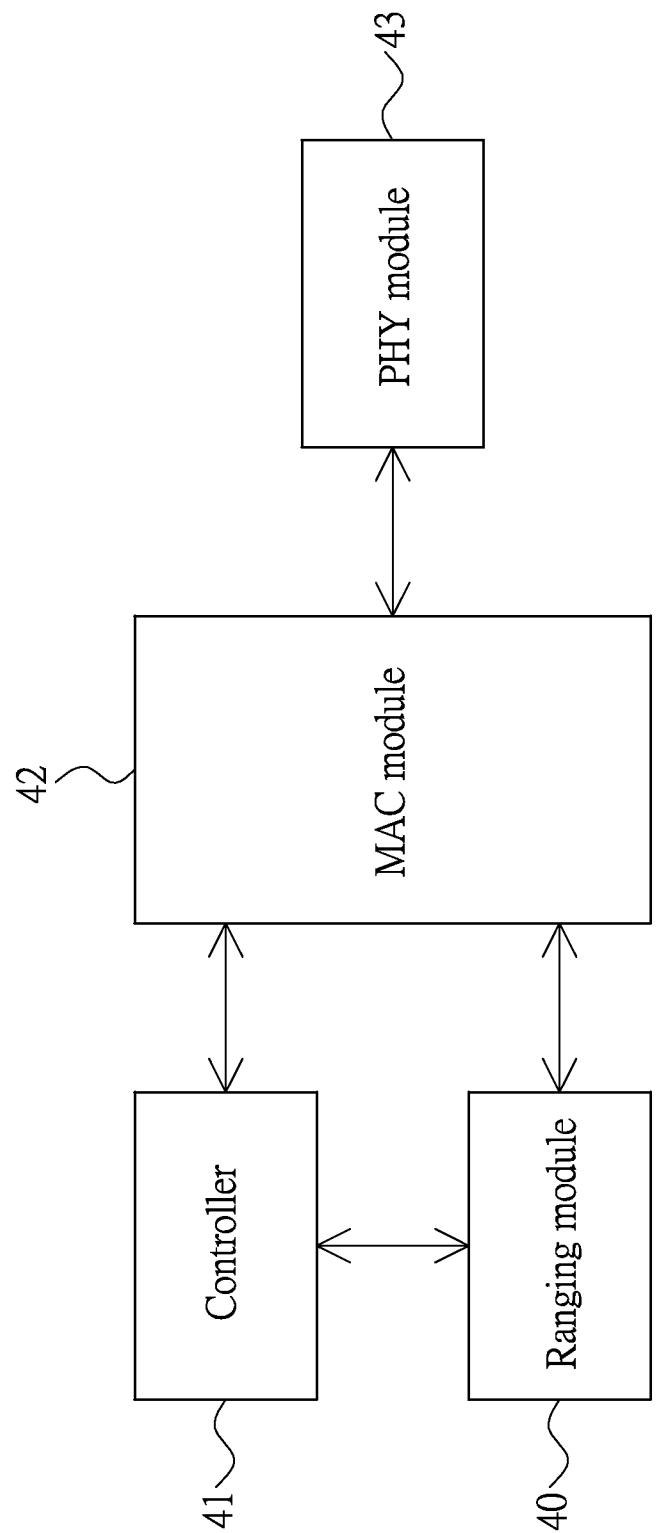
FIG. 4 is a block diagram showing the ranging device according to one exemplary embodiment of the present disclosure.

Referring to FIG. 4 is a block diagram showing the ranging device according to one exemplary embodiment of the present disclosure. The ranging device comprises a ranging module 40, a controller 41, a medium access control (MAC) module 42, and a physical layer (PHY) module 43. The MAC module 42 is connected to the controller 41 and the PHY module 43, and the ranging module 40 is connected between the MAC module 42 and the controller 41.

The PHY module 43 can receive the wireless signal from somewhere, such as the wireless ranging, acknowledge, or reflection signal. The PHY module 43 can further emit the wireless signal, such as the wireless ranging, acknowledge, or reflection signal. Based upon at least one of the above equations, the ranging module 40 considers the standard deviation $\Delta t_{rise}$ of the rising time $t_{rise}$ of the received wireless signal to estimate the distance between the ranging device and the object. The ranging module 40 can further indicates the controller 41 to adjust at least one parameter related to the standard deviation $\Delta t_{rise}$ of the rising time $t_{rise}$.

In one exemplary embodiment of the present disclosure, the ranging module 40 calculates the standard deviation $\Delta t_{rise}$ of the rising time $t_{rise}$, corrects the trip time $t_R$ of the received wireless signal according to the standard deviation $\Delta t_{rise}$ of the rising time $t_{rise}$, and then estimate the distance between the ranging device and the object according to the corrected trip time of the received wireless signal.

The standard deviation $\Delta t_{rise}$ of the rising time $t_{rise}$ can be calculated according to the effective bandwidth $B_{eff}$, the signal energy $E_S$, and the power spectral density of noise $N_0$. Or alternatively, the standard deviation $\Delta t_{rise}$ of the rising time $t_{rise}$ can be calculated according to the signal energy $E_S$, the power spectral density of noise $N_0$, the bandwidth of the IF amplifier, and the duration of the received wireless signal. It is noted that the calculation manner of the standard deviation $\Delta t_{rise}$ of the rising time $t_{rise}$ is not used to limit the present disclosure.

In another exemplary embodiment of the present disclosure, the ranging module 40 calculates the standard deviation $\Delta t_{rise}$ of the rising time $t_{rise}$, and determines whether the standard deviation $\Delta t_{rise}$ of the rising time $t_{rise}$ is smaller than a specific value. If the standard deviation $\Delta t_{rise}$ of the rising time $t_{rise}$ is smaller than a specific value, the ranging module 40 determines that the standard deviation $\Delta t_{rise}$ of the rising time $t_{rise}$ lightly affects trip time $t_R$ of the received wireless signal, and the ranging module 40 estimates the distance between the ranging device and the object according to the trip time $t_R$ of the received wireless signal. If the standard deviation $\Delta t_{rise}$ of the rising time $t_{rise}$ is not smaller than a specific value, the ranging module 40 determines that the standard deviation $\Delta t_{rise}$ of the rising time $t_{rise}$ seriously affects trip time $t_R$ of the received wireless signal, thus the ranging module 40 indicates the controller 41 to adjust one of parameters related to the standard deviation $\Delta t_{rise}$ the rising time of $t_{rise}$, and then performs a ranging action again to obtain the standard deviation $\Delta t_{rise}$ of the rising time $t_{rise}$ in response to the least one adjusted parameter. Therefore, the ranging device can eliminate the standard deviation $\Delta t_{rise}$ of the rising time $t_{rise}$ to increase the ranging accuracy.

Based upon the above descriptions, the effective bandwidth $B_{eff}$, the signal energy $E_S$, the bit energy $E_b$, the bit energy to noise ratio $E_b/N_0$, the pulse shape or type of the wireless signal used, and the specific threshold can be adjusted to decrease the standard deviation $\Delta t_{rise}$ of the rising time $t_{rise}$. For example, the correlative signal can be used as the emitted or responded wireless signal, wherein the correlative signal use both "complementary" representations, such as the correlative signal has the up-chirp and the down-chirp. It is noted that the both "complementary" representations of the correlative signal may have different weighting, for example, the up-chirp and the down-chirp have the different absolute amplitudes.

In another exemplary embodiment of the present disclosure, the ranging module 40 selects one parameter set which minimizes the standard deviation $\Delta t_{rise}$ of the rising time $t_{rise}$ the received wireless signal among a of plurality of parameter sets under a specific constraint. Each parameter set comprises at least one parameter related to the standard deviation $\Delta t_{rise}$ of the rising time $t_{rise}$ the received wireless signal.

Based upon the above descriptions, the effective bandwidth $B_{eff}$, the signal energy $E_S$, the bit energy $E_b$, the bit energy to noise ratio $E_b/N_0$, the pulse shape or type of the wireless signal used, and the specific threshold can be adjusted to decrease the standard deviation $\Delta t_{rise}$ the rising time of $t_{rise}$. Under a specific constraint, for example, a constraint of cost and signal energy $E_S$ constraint, one of the pulse shapes or types of the wireless signals which minimizes the standard deviation $\Delta t_{rise}$ the rising time $t_{rise}$ is selected by the of ranging device, so as to increase the ranging accuracy.

[Exemplary Embodiment of Location Device]

Figure 5:
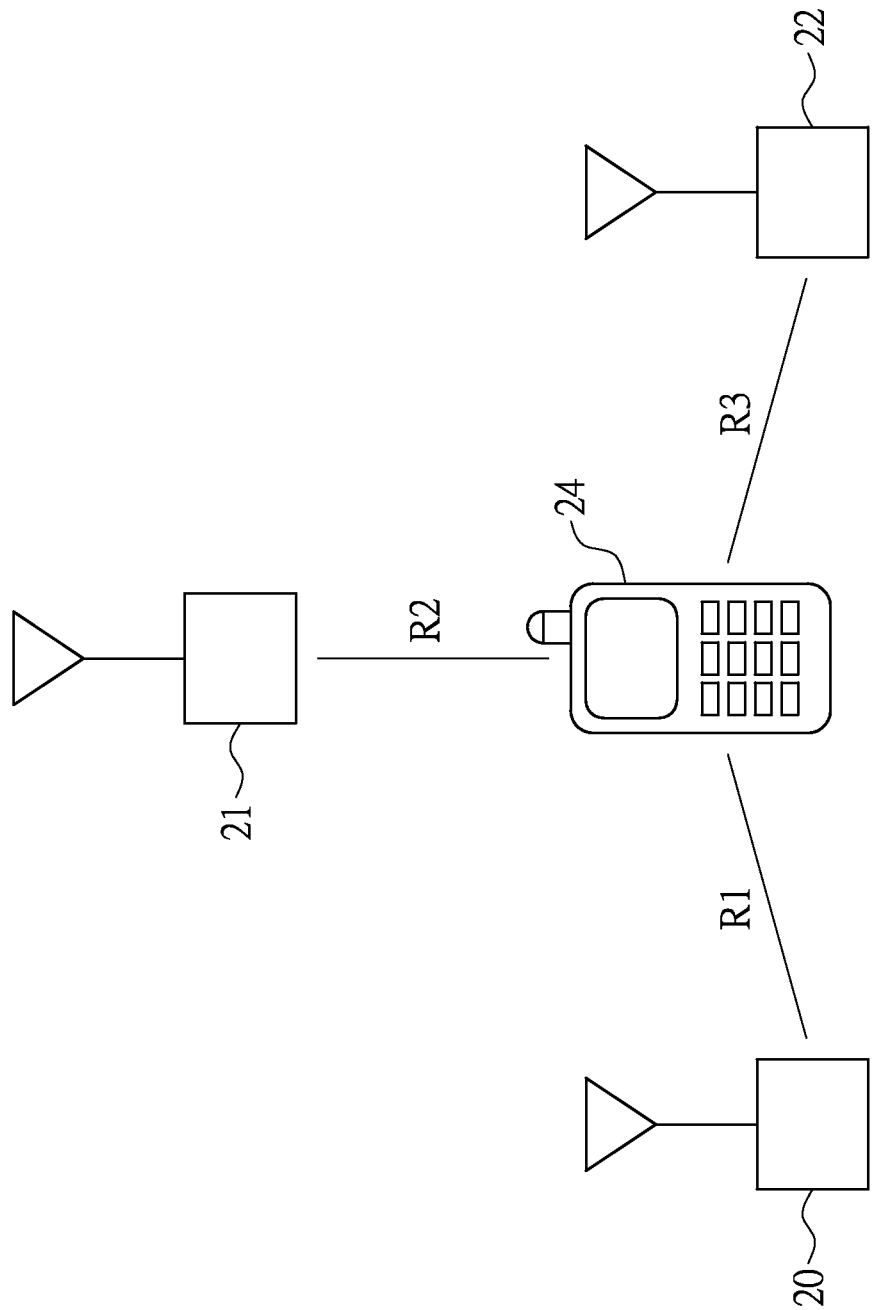
FIG. 5 is a schematic diagram showing a location theory according to one exemplary embodiment of the present disclosure.

Referring to FIG. 5, FIG. 5 is a schematic diagram showing a location theory according to one exemplary embodiment of the present disclosure. In the exemplary embodiment, the cell phone 24 may be equipped the location device, and the location device obtains the distances R1 through R3 between the cell phone 24 and the base stations 20 through 22. Based upon the distances R1 through R3, the location device can determine the location of the cell phone 24.

Figure 6:
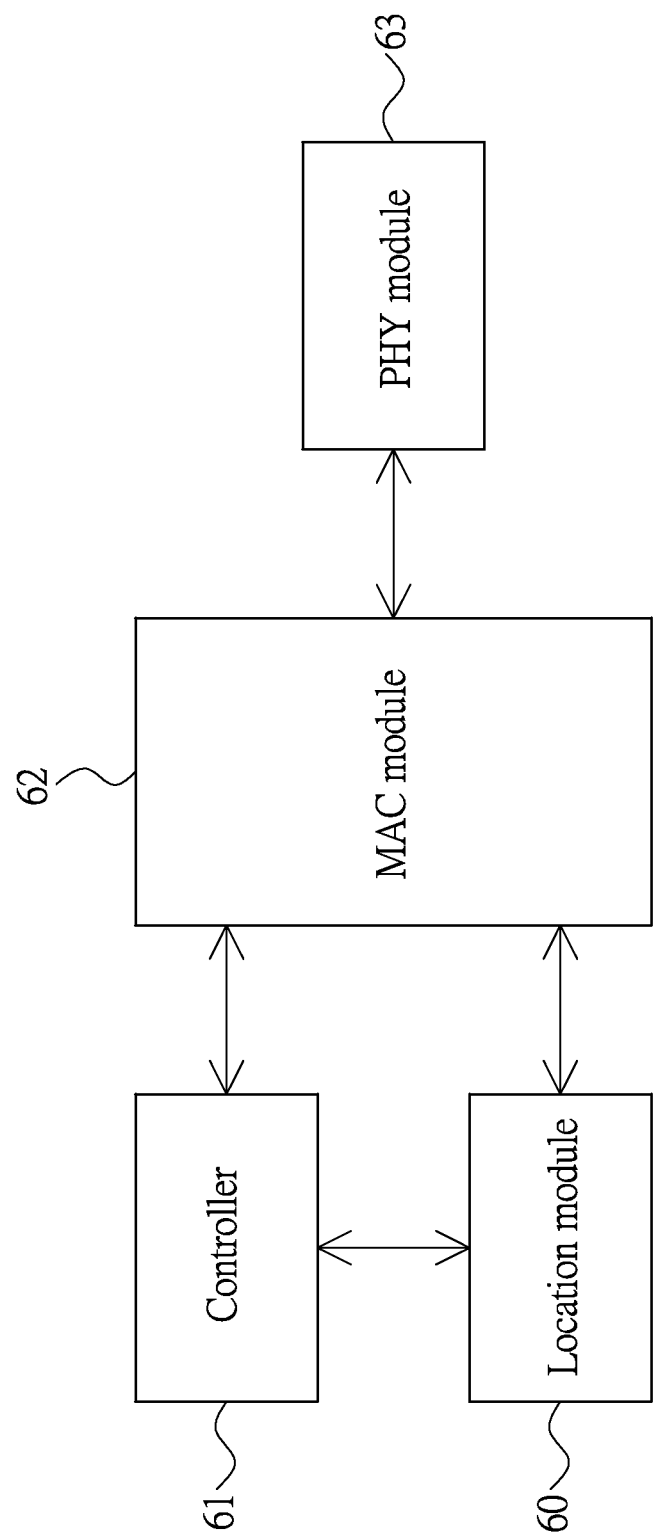
FIG. 6 is a block diagram of a location device according one exemplary embodiment of the present disclosure.

Referring to FIG. 6, FIG. 6 is a block diagram of a location device according one exemplary embodiment of the present disclosure. The ranging device comprises a location module 60, a controller 61, a medium access control (MAC) module 62, and a physical layer (PHY) module 63. The MAC module 62 is connected to the controller 61 and the PHY module 63, and the location module 60 is connected between the MAC module 62 and the controller 61.

The PHY module 63 can receive the wireless signal from somewhere, such as the wireless ranging, acknowledge, or reflection signal. The PHY module 63 can further emit the wireless signal, such as the wireless ranging, acknowledge, or reflection signal. Based upon at least one of the above equations, the location module 60 obtains the information of the distances between the objects and the location device. The distances can be obtained from the above description considering the standard deviation $\Delta t_{rise}$ of the rising time $t_{rise}$ of the received wireless signal. The location module 60 can further indicates the controller 61 to adjust at least one parameter related to the standard deviation $\Delta t_{rise}$ of the rising time $t_{rise}$.

[Exemplary Embodiment of Ranging Method]

Figure 7A:
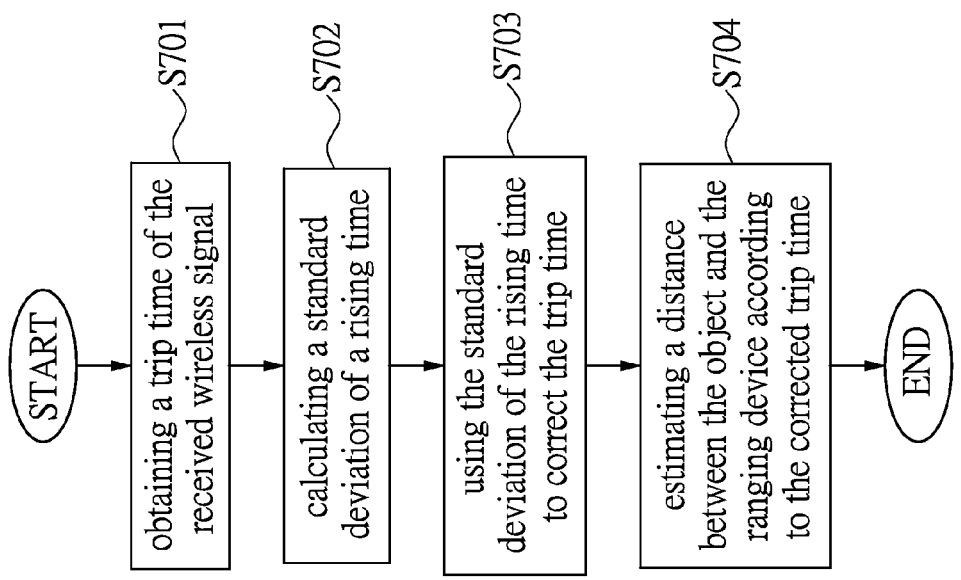
FIG. 7A is a flow chart of a ranging method according to one exemplary embodiment of the present disclosure.

FIG. 7A is a flow chart of a ranging method according to an exemplary embodiment of the present disclosure. At step S701, a trip time of the received wireless signal (such as the wireless ranging signal emitted from the object, the wireless acknowledge signal responded from the object, or the wireless reflection signal from the object) is received by the ranging device. At step S702, the ranging device calculates a standard deviation of a rising time of the received wireless signal, wherein the calculation manner of the standard deviation of a rising time of the received wireless signal is illustrated in the above descriptions, thus omitting the details to calculate the standard deviation of the rising time. At step S703, the ranging device uses the standard deviation of the rising time to correct the trip time of the received wireless signal. At step S704, the ranging device estimates a distance between the object and the ranging device according to the corrected trip time.

Figure 7B:
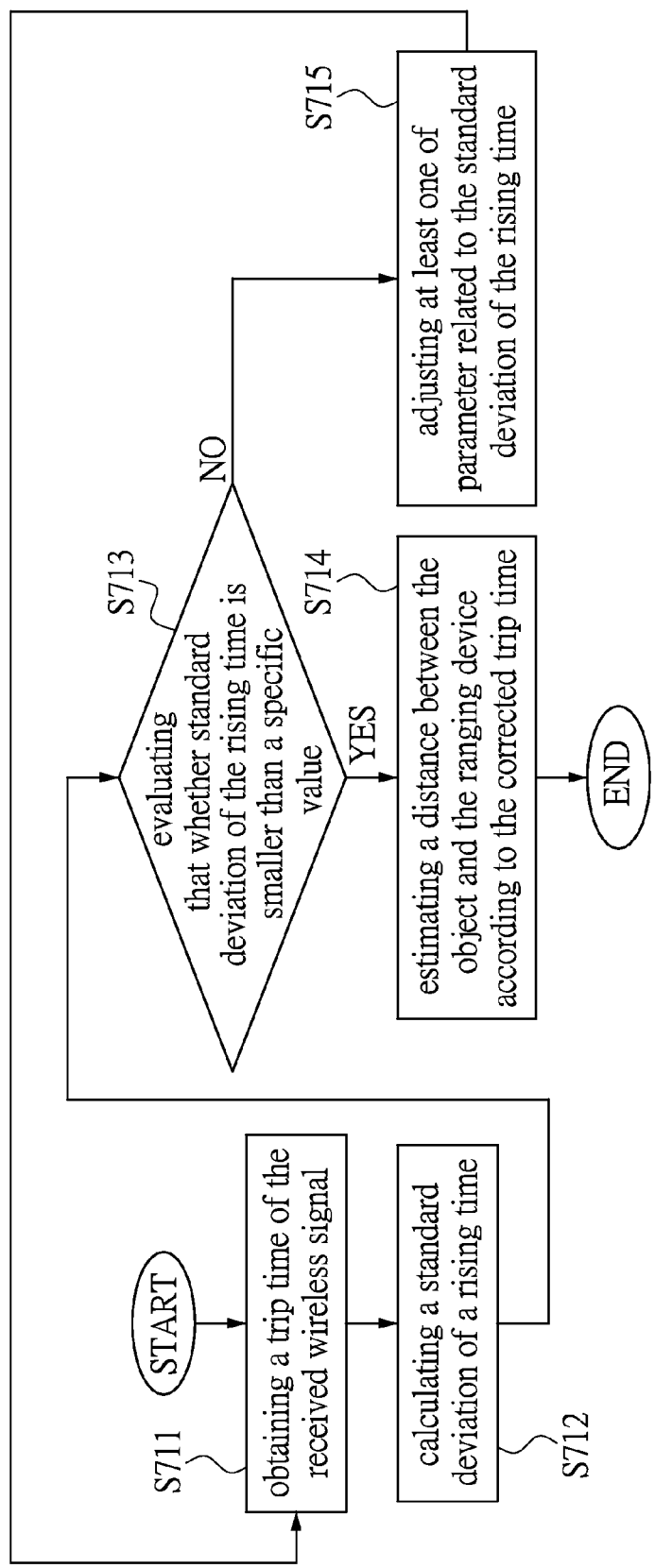
FIG. 7B is a flow chart of a ranging method according to another exemplary embodiment of the present disclosure.

FIG. 7B is a flow chart of a ranging method according to an exemplary embodiment of the present disclosure. At step S711, a trip time of the received wireless signal is received by the ranging device, wherein the received wireless signal is the wireless signal from the object (such as the wireless ranging signal emitted from the object, the wireless acknowledge signal responded from the object, or the wireless reflection signal from the object). At step S712, the ranging device calculates a standard deviation of a rising time of the received wireless signal, wherein the calculation manner of the standard deviation of a rising time of the received wireless signal is illustrated in the above descriptions, thus omitting the details to calculate the standard deviation of the rising time.

At step S713, the ranging device evaluates whether the standard deviation of the rising time is smaller than a specific value.

If the standard deviation of the rising time is smaller than a specific value, step S714 is executed; otherwise, step S715 is executed. At step S714, the ranging device estimates a distance between the object and the ranging device according to the corrected trip time, wherein the corrected trip time is generated by using the standard deviation of the rising time to correct the trip time. At step S715, the ranging device adjusts at least one of parameter related to the standard deviation of the rising time. After the at least one parameter related to the standard deviation of the rising time is adjusted, a ranging action is executed again, i.e. the trip time of the received wireless signal in response to the least one adjusted parameter is received by the ranging device at the re-executed step S711. It is noted that, in FIG. 7B, the execution number which the step S711 is executed may be calculated. If the execution number is larger than a specific value, the ranging method is thus terminated, and such a measuring error report is reported.

Figure 7C:
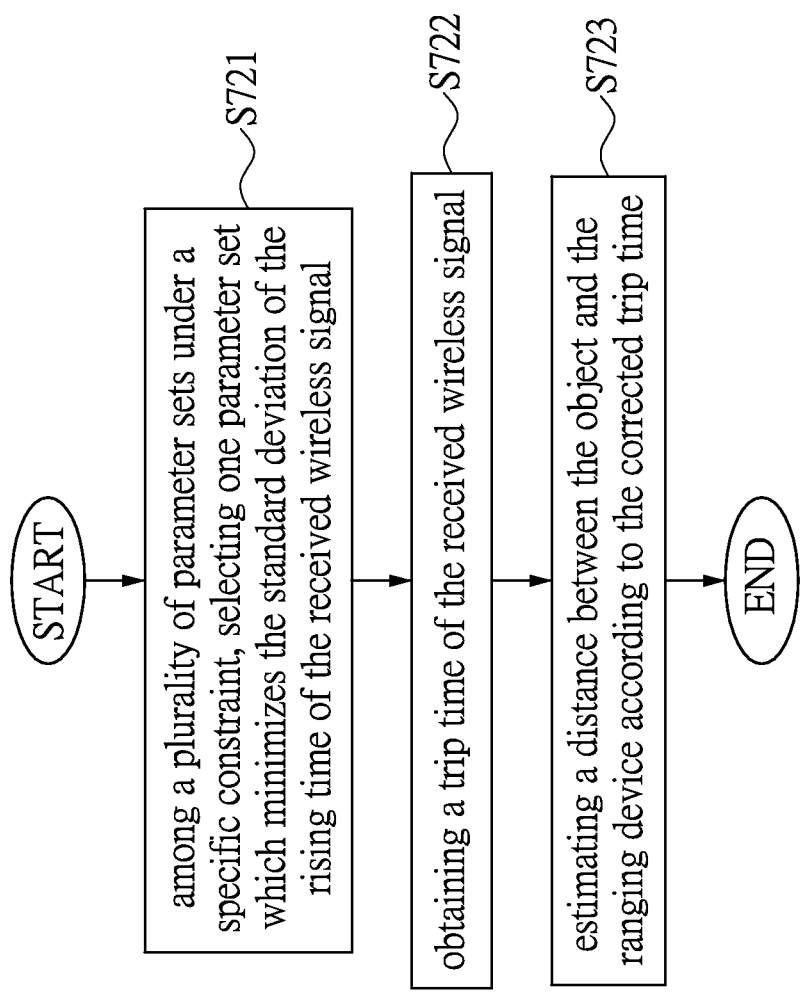
FIG. 7C is a flow chart of a ranging method according to another exemplary embodiment of the present disclosure.

FIG. 7C is a flow chart of a ranging method according to another exemplary embodiment of the present disclosure. At step S721, among a plurality of parameter sets under a specific constraint, the ranging device selects one parameter set which minimizes the standard deviation of the rising time of the received wireless signal, wherein each parameter set comprises at least one parameter related to the standard deviation of the rising time of the received wireless signal. Then, at step S722, a trip time of the received wireless signal is received by the ranging device, and at step S723, the ranging device estimates a distance between the object and the ranging device according to the corrected trip time, wherein the corrected trip time is generated by using the standard deviation of the rising time to correct the trip time.

[Exemplary Embodiment of Location Method]

A location method using one of the above ranging methods is provided in the present disclosure. Firstly, the distances between the objects and the location device are estimated by using the ranging method of the present disclosure, and then the location device determines the location of the location device according to the distances between the objects and the location device.

[Results of Exemplary Embodiment]

To sum up, the ranging and location methods or devices provided in the present disclosure has the larger accuracies than those of the conventional ranging and location methods or devices.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A ranging method, executed in a ranging device, comprising:
    obtaining a trip time of a received wireless signal, wherein the received wireless signal is a wireless signal from an object;
    calculating a statistical value of a rising time of the received wireless signal;
    evaluating whether the statistical value of the rising time of the received wireless signal is smaller than a specific value;

when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time; and when the statistical value of the rising time of the received wireless signal is not smaller than the specific value, adjusting at least one parameter related to the statistical value of the rising time.

2. The ranging method according to claim 1, wherein while considering a noise is an additive white Gaussian noise, the statistical value of the rising time is a standard deviation of the rising time.

3. The ranging method according to claim 2, wherein the standard deviation of the rising time is calculated according to an effective bandwidth of the received wireless signal, energy of the received wireless signal, and a power spectral density of noise.

4. The ranging method according to claim 2, wherein the standard deviation of the rising time is calculated according to energy of the received wireless signal, a power spectral density of noise, a bandwidth of an intermediate frequency amplifier, and a duration of the received wireless signal.

5. The ranging method according to claim 1, wherein the wireless signal is a frequency band limited signal.

6. The ranging method according to claim 1, wherein the wireless signal uses both "complementary" representations of the signals.

7. A location method, executed in a location device, comprising:
obtaining distances between the location device and objects; and
determining a location of the location device according to the distances;
wherein each distance between the location device and the object is obtained by following steps:
obtaining a trip time of a received wireless signal, wherein the received wireless signal is a wireless signal from an object;
calculating a statistical value of a rising time of the received wireless signal;
evaluating whether the statistical value of the rising time of the received wireless signal is smaller than a specific value;
when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time; and
when the statistical value of the rising time of the received wireless signal is not smaller than the specific value, adjusting at least one parameter related to the statistical value of the rising time.

8. The location method according to claim 7, wherein while considering a noise is an additive white Gaussian noise, the statistical value of the rising time is a standard deviation of the rising time.

9. The location method according to claim 8, wherein the standard deviation of the rising time is calculated according to an effective bandwidth of the received wireless signal, energy of the received wireless signal, and a power spectral density of noise.

10. The location method according to claim 8, wherein the standard deviation of the rising time is calculated according to energy of the received wireless signal, a power spectral density of noise, a bandwidth of an intermediate frequency amplifier, and a duration of the received wireless signal.

11. The location method according to claim 7, wherein the wireless signal is a frequency band limited signal.

12. The location method according to claim 7, wherein the wireless signal uses both "complementary" representations of the signals.

13. A ranging device, comprising:
a physic module, for receiving a wireless signal;
a medium access control module, connected to the physic module;
a controller, connected to the medium access control module; and
a ranging module, connected between the medium access control module and the controller, for executing following steps:
obtaining a trip time of a received wireless signal, wherein the received wireless signal is a wireless signal from an object;
calculating a statistical value of a rising time of the received wireless signal;
evaluating whether the statistical value of the rising time of the received wireless signal is smaller than a specific value;
when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time; and
when the statistical value of the rising time of the received wireless signal is not smaller than the specific value, adjusting at least one parameter related to the statistical value of the rising time.

14. The ranging device according to claim 13, wherein while considering a noise is an additive white Gaussian noise, the statistical value of the rising time is a standard deviation of the rising time.

15. A location device, comprising:
a physic module, for receiving a wireless signal;
a medium access control module, connected to the physic module;
a controller, connected to the medium access control module; and
a location module, connected between the medium access control module and the controller, for executing following steps:
obtaining distances between the location device and objects; and
determining a location of the location device according to the distances;
wherein each distance between the location device and the object is obtained by following steps:
obtaining a trip time of a received wireless signal, wherein the received wireless signal is a wireless signal from an object;
calculating a statistical value of a rising time of the received wireless signal;
evaluating whether the statistical value of the rising time of the received wireless signal is smaller than a specific value;

when the statistical value of the rising time of the received wireless signal is smaller than the specific value, estimating a distance between the object and the ranging device according to a corrected trip time, wherein the statistical value of the rising time of the received wireless signal corrects the trip time of the received wireless signal to generate the corrected trip time; and when the statistical value of the rising time of the received wireless signal is not smaller than the specific value, adjusting at least one parameter related to the statistical value of the rising time.

16. The location device according to claim 15, wherein while considering a noise is an additive white Gaussian noise, the statistical value of the rising time is a standard deviation of the rising time.

* * * * *